Sept. 15, 1936.  W. V. McDONALD  2,054,204
GLOVE TESTING DEVICE
Filed Jan. 15, 1936  2 Sheets-Sheet 2
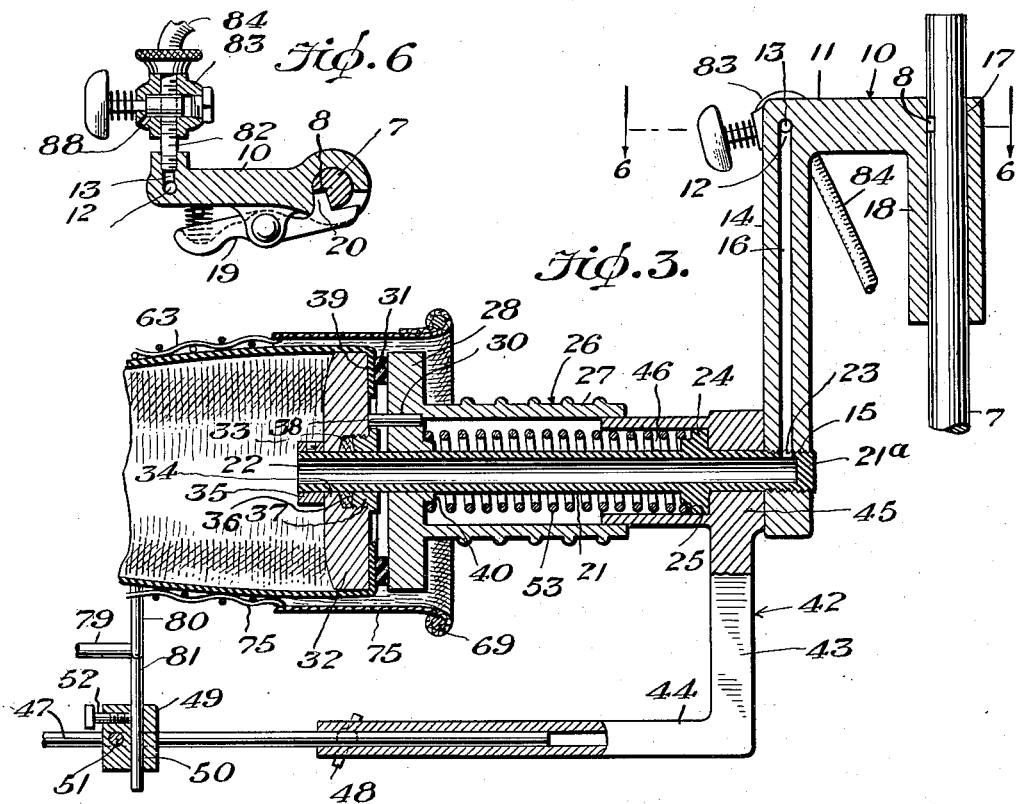
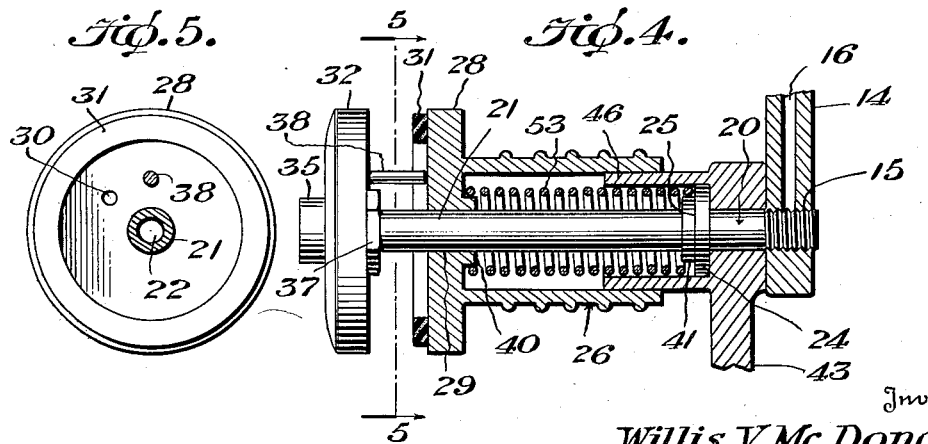
Inventor
Willis V. McDonald
By Geo. P. Kimmel
Attorney Patented Sept. 15, 1936

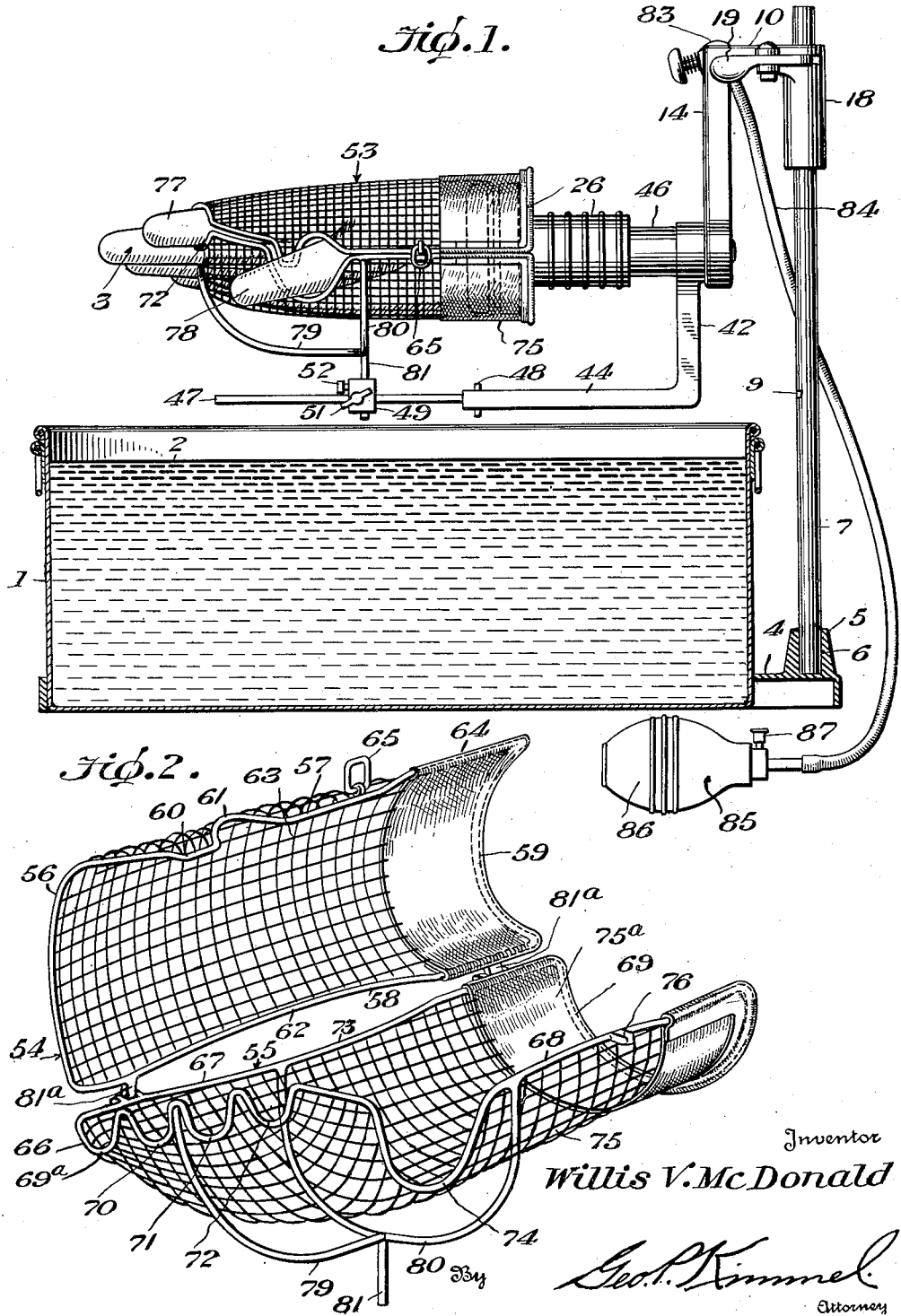

2,054,204

UNITED STATES PATENT OFFICE 2,054,204

GLOVE TESTING DEVICE

Willis V. McDonald, Abilene, Tex.

Application January 15, 1936, Serial No. 59,300

10 Claims. (Cl. 73—51)

This invention relates to a glove testing apparatus designed primarily for the testing of rubber gloves, employed by surgeons, but it is to be understood that the testing apparatus, in accordance with this invention may be used in any connection for which it is found applicable.

The importance of gloves in a surgical operation being free of holes or even needle prick points cannot, as all surgeons know, be over emphasized, and it is the object of this invention to provide, in a manner as hereinafter set forth, an apparatus to act upon a glove before it is worn by a surgeon to determine whether or not the glove is impaired by being formed with an aperture or apertures in the stalls for the fingers and thumb as well as in the back and palm portions thereof.

A further object of the invention is to provide, in a manner as hereinafter set forth, a glove testing apparatus which permits of enough air to be pumped into the glove to force even the smallest of apertures, that a glove may be formed with to leak air and at the same time not allow the glove to bulge and stretch the rubber beyond its elastic limit, thus permitting a safe and sure test without stretching the life out of the rubber.

Further objects of the invention are to provide, in a manner as hereinafter set forth, an apparatus for the purpose referred to which is simple in its construction and arrangement, strong, durable, compact, conveniently and expeditiously arranged and operated when testing, thoroughly efficient in its use, readily assembled and comparatively inexpensive to manufacture.

With the foregoing and other objects which may hereinafter appear, the invention consists of the novel construction, combination and arrangement of parts as will be more specifically described and are as illustrated in the accompanying drawings wherein is shown the preferred embodiment of the invention, but it is to be understood that changes, variations and modifications may be resorted to which fall within the scope of the invention as claimed.

In the drawings:

Figure 1 is a side elevation partly in section of the apparatus and a glove disposed thereon to be tested, Figure 2 is a perspective view of the combined glove supporting and bulge preventing element, Figure 3 is a fragmentary view of the apparatus in longitudinal section, Figure 4 is a longitudinal sectional view of the glove holder forming an element of the apparatus, Figure 5 is a section on line 5—5 Figure 4, and Figure 6 is a section on line 6—6 Figure 3.

The apparatus includes an open top tank 1 for containing a body of water 2 into which the glove 3 is to be submerged during the testing operation therefor. One end of tank 1 at its bottom is formed with a lateral extension 4 approximately centrally thereof. Integral with the top of extension 4 is a vertically disposed socket forming member 5 having the socket 6 provided thereby open at its upper end. Positioned within socket 6 is the lower end of a standard 7. The latter is of greater height than and projects above the open top of tank 1. The standard 7 near its upper end is formed with a pocket 8 in its periphery and at a point above and in proximity to the top of tank 1 is also formed with a peripheral socket 9.

Slidably mounted on the standard 7 is a vertically adjustable carrier 10 of substantially inverted U-shape contour. The carrier 10 consists of an upper horizontally disposed leg 11 formed at its outer end with a vertical passage 12 and a horizontally disposed port 13 opening at its inner end into the upper end of passage 12. Formed integral with and depending from the inner end of leg 11 is the upper end of a vertically disposed arm 14 provided near its lower end with a diametrically extending circular opening 15 having its wall threaded. The arm 14 axially thereof is formed with a channel 16 registering at its upper end with the passage 12 and at its lower end communicating with opening 15. The rear end of leg 11 is formed with a vertical opening 17 and registering with the latter is the inner face of a vertically disposed sleeve 18 which is integral with and depends from the leg 11. The arm 14 is of greater length than the sleeve 18. The latter is slidably mounted on the standard 7. Pivotally mounted on one side of leg 11 is a spring controlled latching member 19 formed with a nose 20 for selective engagement with the pockets 8, 9 to releasably secure the carrier 10 to and at right angles to standard 7 or in other words to releasably maintain the carrier 10 in its upper or in its lower position relative to standard 7. When the nose of member 19 is clear of the pockets 8, 9 the carrier 10 may be shifted lengthwise of or revolved about standard 7.

The apparatus includes a combined supporting shaft and air conducting element 20 consisting of a tubular member 21 closed at its rear end, as at 21a and opening at its forward end as at 22. The member 21 in proximity to its rear end is provided with a port 23. The rear terminal portion of member 21 is mounted in opening 15 and is formed with peripheral threads engaging with the threads of the wall of opening 15. The member 21 between its transverse median and rear end is formed with an integral peripheral collar 24 having its edge rabbeted to form a shoulder 25.

The apparatus includes a spring controlled glove holding element 26 consisting of a peripherally ribbed tubular handle 27 open at its rear end and having its forward end closed by a disc 28 of greater outer diameter than that of handle 27. The disc 28 is slidably mounted on member 21 and is formed axially thereof with an opening 29 for the passage of the said member. The disc 28 is also formed adjacent opening 29 with a socket 30 which opens at the forward face of the disc. Secured to the forward face of the disc 28 is a resilient annulus 31 of a diameter to extend in close proximity to the outer edge of disc 28. Arranged in juxtaposition with respect to and forwardly of disc 28 is a disc 32. The latter and the disc 28 constitute what may be termed clamping members. The disc 32 axially thereof is provided with a socket 33 having a portion of its wall threaded. The socket 33 opens at the rear face of disc 32. The latter is also formed with an axially arranged opening 34 which at its rear end communicates with the socket 33. The element 20 extends through the socket 33 and opening 34 and projects forwardly from disc 32. The forwardly projecting portion of element 20 has fixed thereto a stop collar 35 which bears against the forward face of disc 32. Arranged within the socket 33 is a packing 36 and engaging with the threaded portion of the wall of socket 33 is a packing gland 37. Secured to the rear face of disc 32 is a locking pin 38 which is adapted to removably engage in the socket 30 for connecting discs 28 and 32 together. The pin 38 also functions as a spacing means between the discs 28 and 32 when the pin is removed from socket 30 and disc 32 turned sufficiently to provide for pin 38 to abut the forward face of disc 28 as is shown in Figure 4. When the glove 3 is to be mounted on the holder 26 the disc 28 is shifted rearwardly against the action of a controlling spring, to be referred to and manually held, and then a portion of the rear end of the glove is seated on the edge of disc 32, after which another portion of said rear end is bent inwardly to abut the rear face of disc 32. After the rear end of the glove has been positioned as aforesaid, the controlling spring is released which shifts the disc 28 forwardly to provide for the annulus 31 to bind against the inturned portion 39 of the glove. Prior to the binding of the portion 39 of the glove, the discs 28, 32 are so positioned relatively to each other, that when the controlling spring shifts disc 28 forwardly the pin 38 will engage in the socket 30 whereby the discs 28 and 32 will be locked together and the rear portion of the glove clamped to the holder 26. When the glove is clamped, the holder and glove will appear as shown in Figure 3. The rear face of the disc 28 is formed with annular boss 40 having its inner edge flush with the wall of opening 29. The boss 40 corresponds in outer diameter to the outer diameter of the reduced portion 41 of the collar 24.

The apparatus includes a suspension element 42 of angle form consisting of a vertically disposed leg 43 and a horizontally disposed leg 44 which is integral with and extends forwardly from the lower end of the leg 43. The upper end of leg 43 is provided with an annular enlargement 45 for the purpose of mounting element 42 on element 20 between collar 24 and arm 14. The element 42 is revolubly mounted on element 20. Formed integral with the forward face of enlargement 45 is a forwardly directed tubular extension 46 which surrounds the collar 24 and extends into the handle 27. The latter is slidably mounted on the extension 46. The leg 44 is tubular and has slidably mounted therein a forwardly extending rod 47. The rod 47 is lengthwise adjustable relative to leg 44. A binding screw 48 is carried by leg 44 for releasably securing the rod 47 in adjusted position. The rod 47 provides for increasing or decreasing the length of the bottom of the element 42. Slidably mounted on the rod 47 is a block 49 formed with a vertical opening 50 for a purpose to be referred to. The block 49 is adjusted relative to rod 47 and is releasably held in its adjusted position by a set screw 51 carried by the block. The latter also carries a set screw 52 for a purpose to be referred to.

The controlling spring for the element 26 is indicated at 53 and it is interposed between the rear face of disc 28 and the shoulder 24. The ends of the spring 52 encompass the boss 40 and the reduced portion 41 of the collar 24. The spring 52 permanently tends to force the disc 28 towards the disc 32.

The apparatus includes a vertically and horizontally adjustable combined glove supporting and bulge preventing element 53 formed of a pair of half-round complementary sections 54, 55. The element 53 has an open rear end for encompassing the discs 28 and 32 during the testing operation. The section 54 consists of a half-round wire frame having a forward end portion 56, side portions 57, 58 and a rear end portion 59. The side portion 57 has a stretch thereof, intermediate its ends bent to form a pair of oppositely extending open loop-like forming parts 60, 61. The side portion 58 has the intermediate portion thereof curved as at 62. Secured to the frame of section 54 is a reticulated panel 63. The rear portion of the section 54 is provided with a fabric strip 64 disposed transversely thereof and connected to the side portions 57, 58 and end portion 59 of the frame. The section 54 carries a latching member 65. The section 55 includes a half-round frame of concave contour formed of a forward end portion 66, side portions 67, 68 and a rear end portion 69. The forward end portion 66 is bent to provide open upper end loops 69a, 70, 71 and 72. The side portion 67 intermediate its ends is curved as at 73 and with the curvature oppositely disposed with respect to the curved part 62 of side portion 58 of the frame of section 54. The side portion 68 of the frame of the section 55 is formed intermediate its ends with an open top loop 74. Secured to the frame of the section 55 is a reticulated panel 75. The rear portion of section 55 is provided with a transversely extending fabric strip 75a secured to the side portions 67, 68 and end portion 69 of the frame of the section 55. The side portion 68 is provided with keeper 76 which coacts with the member 65 for latching the sections 54, 55 together and with the section 54 in superimposed relation with respect to section 55.

The loops 69a, 70, 71 and 72 provide for the passage of the finger stalls 77 of the glove 3 when the latter is mounted in the element 53. The loops 61 and 74 coact to provide an opening for the passage of the thumb stall 78 of the glove when the latter is mounted in the element 53.

Formed integral with, depending from and extending rearwardly from the end portion 66 of the section 55 is a coupling member 79. Formed integral with the side portions 67, 68 of the frame of the section 55 is a depending yoke 80 into the bottom of which merges the rear end of the coupling member 79. The bottom of yoke 80 is formed integral with an upper end of a vertical rod 81 which passes through the opening 50 in the block 49. The rod 81 is vertically adjustable relative to the block 49 and is also bodily carried by said block. The rod 81 is detachably secured to block 49 for the purpose of maintaining rod 81 in its adjusted position and also to provide for rod 81 being carried bodily with the block 49 by the set screw 52. The adjustment of the rod 81 provides for vertically adjusting the element 53 when desired and owing to the adjustment of the block 49 the element 53 may be adjusted horizontally with respect to the element 26 to compensate for different lengths of gloves. The fabric strips 64 and 75a surround and protect the rear portion of the glove. The panels 63 and 75 prevent the bulging of a glove when it is being tested as well as act to prevent the glove stretching beyond its elastic limit. The element 53 acts to support the glove in extended position relative to the element 26. The sections 54, 55 of element 53 are hinged together as at 81a.

Secured to the leg 11 and opening into the port 13 is a combined intake and outlet nipple 82 which communicates with a controlling valve 83. Opening into the valve 83 is an air supply pipe 84 leading from a pump 85 which is in the form of a compressible and extendible bulb 86 provided with an air intake 87. The valve structure 83 has a relief port 88.

The test is made by inflating the glove when it is arranged in the element 53 by means of the pump 85, and after the inflation of the glove the latter and element 53 is lowered on standard 7 to an extent to provide for said element to be submerged in the body of water 2, and if bubbles of air appear in the water they will indicate that the material of the glove is formed with an opening or openings.

During the testing operation, as the elements 26 and 42 are revolubly mounted on element 20, they in connection with element 53 may be bodily revolved together or turned over and over again while the glove is submerged in the water. This enables the operator of the apparatus to locate the exact point of a hole that may be in the glove. Knowing the exact location of the hole facilities the repairing of the glove.

The drawings show the apparatus in position for testing a right-hand glove. When a left-hand glove is to be tested it is turned inside out and then positioned on the assembly.

What I claim is:

1. In a glove testing apparatus, a glove holder for extension into the wrist end of a glove and having means for clamping said end thereto, a vertically adjustable supporting structure for said holder, said structure being formed with means for supplying air to the glove on the holder to inflate the glove, a suspension structure bodily carried with said supporting structure, a horizontally adjustable combined glove supporting and bulge preventing element for encompassing and maintaining the glove attached to the holder horizontally and adapted to be submerged in a body of water to provide for the testing of the glove, said element and suspension structure having coacting means for connecting them together, and said holder being slidably mounted on said supporting structure for extension into one end of said element.

2. The invention as set forth in claim 1 having said element formed of a pair of hinged latchable oppositely disposed concave-convex foraminous sections.

3. The invention as set forth in claim 1 having said element formed of a pair of hinged latchable oppositely disposed concave-convex foraminous sections, one provided with means for supporting the finger and thumb stalls of the glove in extended relation thereto.

4. The invention as set forth in claim 1 having the coacting means of and for connecting said element and suspension structure together including parts disposed at right angles to provide for vertically and horizontally adjusting of said element relative to said suspension structure and horizontally relative to the holder.

5. The invention as set forth in claim 1 having said holder formed with a pair of clamping members for the wrist end of the glove and with one of said members spring controlled.

6. The invention as set forth in claim 1 having said holder formed with a pair of opposed clamping members for the glove and with one of said members formed with a resilient annulus on one face thereof to engage the wrist end of the glove.

7. The invention as set forth in claim 1 having said air supply means formed with an air conductor extending through said holder for opening into the glove, and a valve for controlling the passage of air through said conductor.

8. The invention as set forth in claim 1 having combined therewith a standard extending through said supporting structure, said structure being vertically slidable and revoluble relative to the standard, and said supporting structure and standard having coacting means for selectively latching the supporting structure at selected points on the standard.

9. The invention as set forth in claim 1 having combined therewith a tank adapted to contain a body of water in which the said glove supporting and bulge preventing element is adapted to be submerged, a standard supported from one end of the tank and extending upwardly through said supporting structure, the latter and said standard having coacting means for latching them together at selected points on the standard.

10. The invention as set forth in claim 1 having the glove supporting and bulge preventing element formed of a foraminous top and bottom.

WILLIS V. McDONALD.